United States Patent [19]
Patel et al.

[11] Patent Number: 5,532,755
[45] Date of Patent: Jul. 2, 1996

[54] APPARATUS FOR SUPPRESSING GHOSTS IN SIGNALS MODULATING A CARRIER IN QUADRATURE PHASING WITH A VIDEO CARRIER

[75] Inventors: Chandrakant B. Patel, Hopewell, N.J.; Jian Yang, Bensalem, Pa.

[73] Assignee: Samsung Electronics Co., Ltd., Kyungki-Do, Rep. of Korea

[21] Appl. No.: 179,616

[22] Filed: Jan. 5, 1994

[51] Int. Cl.[6] ................................................. H04N 5/21
[52] U.S. Cl. ........................................ 348/614; 348/607
[58] Field of Search .................................. 348/614, 607; 358/36, 167, 905; H04N 5/21

[56] References Cited

U.S. PATENT DOCUMENTS

| | | | |
|---|---|---|---|
| 5,177,611 | 1/1993 | Gibson et al. | 348/614 |
| 5,276,507 | 1/1994 | Uwabata et al. | 348/614 |
| 5,331,416 | 7/1994 | Patel et al. | 348/614 |

OTHER PUBLICATIONS

T. C. Leslie and B. Singh, "An Improved Sigma–Delta Modulator Architecture", 1990 IEEE Symposium on Circuits & Systems, 90 CH 2868–8900000–0372, pp. 372–375.

*Primary Examiner*—Safet Metjahic
*Assistant Examiner*—Chris Grant
*Attorney, Agent, or Firm*—Sughrue, Mion, Zinn, Macpeak & Seas

[57] ABSTRACT

Composite video signal and a relatively low power phase-shift-keyed (PSK) signal encoding digital information are transmitted on respective phases of a video carrier in quadrature with each other. Selected scan lines of the composite video signal contain ghost-cancellation reference (GCR) signals. A digital signal receiver performs a first detection of the video carrier modulated in the two phases, down-converting to an intermediate-frequency (IF) signal. This IF signal is selectively amplified prior to respective second detection of the down-converted video carrier by in-phase and quadrature-phase synchronous video detectors. A first cascade filter connection of a first ghost-cancellation filter and a first equalization filter follows the in-phase video detector, and a second cascade filter connection of a second ghost-cancellation filter and a second equalization filter follows the quadrature-phase video detector. Gating circuitry selects scan lines containing GCR signals from the video signal response of the first cascade filter connection for accumulation, which generates separated ghosted GCR signal for use by a computer such as a microcomputer. Adjustable parameters of the ghost-cancellation filters are adjusted in parallel responsive to computer calculations, while adjustable parameters of the equalization filters are also adjusted in parallel responsive to further computer calculations. Iterative feedback reduces ghosts in the response of the first cascade filter connection. Ghosts in the response of the second cascade filter connection are reduced in an analogous manner.

15 Claims, 4 Drawing Sheets

APPARATUS FOR SUPPRESSING GHOSTS IN SIGNALS MODULATING A CARRIER IN QUADRATURE PHASING WITH A VIDEO CARRIER

The invention relates to receivers for recovering auxiliary signals transmitted in quadrature with a video carrier modulated by analog composite video signals and, more particularly, to the suppression of ghosting of those auxiliary signals, which can by way of example encode digital information.

BACKGROUND OF THE INVENTION

Relatively low-power (e.g., 10 dB above noise floor) auxiliary signals encoding digital information can be admixed together with composite video signals without being objectionably evident in television pictures generated from those composite video signals, if suitable restrictions on the digital signal format are observed. It is advantageous to use a suppressed, vestigial-sideband, amplitude-modulated (VSB AM) carrier of the same frequency as the VSB AM picture carrier, but in quadrature phasing therewith, for transmitting the digital data. This procedure permits the synchronous detection of the modulation of that quadrature carrier to recover the digital data. If the bandwidth of the receiver is sufficient to include the entire vestigial sideband, remnant composite video signal accompanying the digital data as an interfering signal will not have substantial energy in the baseband extending up to 0.75 MHz in frequency. It is around 0.75 MHz that the VSB AM video carrier begins the transition from being a double-sideband amplitude-modulated (DSB AM) carrier to being a single-sideband amplitude-modulated (SSB AM) carrier, and at lessened energy up to the 1.25 MHz frequency at which roll-off of the vestigial sideband is complete.

A. L. R. Limberg, C. B. Patel and T. Liu in their U.S. patent application Ser. No. 08/108,311 filed 20 Aug. 1993, entitled APPARATUS FOR PROCESSING MODIFIED NTSC TELEVISION SIGNALS, WITH DIGITAL SIGNALS BURIED THEREWITHIN, and incorporated by reference herein describe phase-shift-keying (PSK) modulation of a subcarrier of the VSB AM carrier that is in quadrature phasing with the VSB AM video carrier of the same frequency. The frequency of their subcarrier is an odd multiple of one-half scan line frequency, and it is phase-shift-keyed in accordance with serial-bit digital data supplied at a symbol rate that is a multiple of scan line frequency. Limberg et alii prefer transmitting frames of the modulated subcarrier twice, but in opposite phasing in each successive pair of consecutive frames of the NTSC television signal. Because of frame-averaging effects resulting from the limitations on the speeds of the response of the human visual system and the decay of electroluminescence of kinescope phosphors, such repetition of data in pairs of frames makes PSK subcarrier accompanying the composite video signal detected from the NTSC television signal less visible in images that are generated from the composite video signal for viewing on a screen. Such repetition of data in pairs of frames also provides a basis for using frame-comb filtering in a digital signal receiver to separate PSK subcarrier from the luminance portion of the composite video signal that describes static portions of successive television images. Limberg et alii prefer also repeating the modulation of the digital data in antiphase in contiguous pairs of adjoining scan lines of the NTSC television signal, providing a basis for using line-comb filtering in the digital signal receiver to separate PSK subcarrier from the chrominance portion of the composite video signal.

Limberg et alii describe a digital signal receiver in which the synchronous video detector for quadrature-phase VSB AM video carrier is followed by a cascade connection of a lowpass line-comb filter and a highpass frame-comb filter. The lowpass line-comb filter is for separating the frequency spectrum of a PSK subcarrier having a frequency that is an odd multiple of half-scan-line frequency from chrominance signal portions of the frequency spectrum of an NTSC signal, particularly of an NTSC signal that has been appropriately pre-filtered. The highpass frame-comb filter is for separating the frequency spectrum of a PSK subcarrier having a frequency that is an odd multiple of half-scan-line frequency from motion-free luminance signal portions of the frequency spectrum of an NTSC signal. Limberg et alii teach that the remnant spectrum of the NTSC signal in the response of the cascaded highpass comb filters can be viewed as the frequency spectrum of a jamming signal accompanying the PSK signal. Accordingly, the remnant spectrum of the NTSC signal in the response of the cascaded highpass comb filters can be discriminated against by synchronous symbol detection.

J. Yang describes binary phase-shift-keyed (BPSK) modulation of a suppressed carrier that is the same frequency as a video carrier and is in quadrature phasing therewith in his U.S. patent application Ser. No. 08/141,070, filed 26 Oct. 1993, entitled APPARATUS FOR PROCESSING NTSC TV SIGNALS HAVING DIGITAL SIGNALS ON QUADRATURE-PHASE VIDEO CARRIER and incorporated herein by reference. The suppressed carrier that is in quadrature phasing with the video carrier is phase-shift-keyed directly, without any subcarrier being used. Yang also advocates transmitting frames of the modulated subcarrier twice, but in opposite phasing in each successive pair of consecutive frames of the NTSC television signal, just as Limberg et alii do. Yang advocates the BPSK signals being constrained to about 2 MHz bandwidth, so as to avoid crosstalk into chroma in TV receivers that separate chroma from luma without recourse to comb filtering. Yang indicates a preference for passing the data to be transmitted through a pre-line-comb partial-response filter prior to its digital-to-analog conversion to an analog modulating signal for a balanced amplitude modulator. This is done to preserve the information contained therein when line-comb filtering is done in the digital signal receiver to separate PSK subcarrier from the luminance portion of the composite video signal. Line-comb filtering in the digital signal receiver converts the partial-response filtered binary digital signal to ternary digital signal, if the line-comb filtering is of the two-tap type, linearly combining signals differentially delayed by only the duration of one horizontal scan line of video signal. Line-comb filtering in the digital signal receiver converts the partial-response filtered binary digital signal to five-level digital signal, if the line-comb filtering is of the three-tap type, linearly combining signals differentially delayed by the duration of one horizontal scan line of video signal and by the duration of two horizontal scan lines of video signal. Therefore, multi-level symbol decision circuitry is required to recover bit-serial digital data transmitted by the BPSK from the comb filtering response.

U.S. patent application Ser. No. 08/179,618 filed 5 Jan. 1994 by J. Yang and A. L. R. Limberg, entitled "PRE-FRAME-COMB" AS WELL AS "PRE-LINE-COMB" PARTIAL-RESPONSE FILTERING OF BPSK BURIED IN A TV SIGNAL, describes a pre-frame-comb partial-response filter as well as pre-line-comb partial-response filtering being used at the digital signal transmitter for processing bit-serial data from which BPSK modulating signal is generated for the carrier in quadrature phasing with the video carrier. Line-comb filtering in the digital signal receiver converts the partial-response filtered binary digital signal to five-level digital signal, if the line-comb filtering is of the two-tap type, linearly combining signals differentially delayed by only the duration of one horizontal scan line of video signal. Line-comb filtering in the digital signal receiver converts the partial-response filtered binary digital signal to nine-level digital signal, if the line-comb filtering is of the three-tap type, linearly combining signals differentially delayed by the duration of one horizontal scan line of video signal and by the duration of two horizontal scan lines of video signal.

U.S. patent application Ser. No. 08/179,588 filed 5 Jan. 1994 by J. Yang and A. L. R. Limberg, and entitled APPARATUS FOR PROCESSING BPSK SIGNALS TRANSMITTED WITH NTSC TV ON QUADRATURE-PHASE VIDEO CARRIER, describes BPSK modulating signal for the carrier in quadrature phasing with the video carrier being generated directly from bit-serial data without any pre-comb-filter partial-response filtering. The same patent application describes digital signal receivers, which use a cascade connection of a highpass frame-comb filter and a highpass line-comb filter after the quadrature video detector to suppress interfering remnant luminance signal, which use plural-level symbol decision circuitry for the comb filter response, and which use post-comb-filter partial-response filtering after the symbol decision circuitry for undoing the data alteration caused by the comb filtering.

Receivers for the Yang system are also described by T. V. Bolger in his U.S. patent application Ser. No. 08/141,071, filed 26 Oct. 1993, entitled RECEIVER WITH OVERSAMPLING ANALOG-TO-DIGITAL CONVERSION FOR DIGITAL SIGNALS WITHIN TV SIGNALS, and incorporated herein by reference. These receivers digitize the reponse of a quadrature-phase video detector using an oversampling analog-to-digital converter. The digitized quadrature-phase video detector response is subjected to digital frame-comb and line-comb filtering to suppress remnant composite video signals; the comb filtering response is supplied to multi-level symbol decision circuitry to recover bit-serial digital data transmitted by the BPSK; and the bit-serial digital data is supplied to a decoder that corrects the digital information in the data using forward-error-correcting codes contained therein.

Receivers for the Yang system are also described by J. Yang, T. V. Bolger and A. L. R. Limberg in U.S. patent application Ser. No. 08/179,586 filed 5 Jan. 1994, entitled RECEIVER WITH SIGMA-DELTA ANALOG-TO-DIGITAL CONVERSION FOR DIGITAL SIGNALS BURIED IN TV SIGNALS, and incorporated herein by reference. These receivers digitize the response of a quadrature-phase video detector using an oversampling analog-to-digital converter of sigma-delta type. Preferably, the bit resolution of a basic multiple-bit-resolution flash converter is improved by using a sigma-delta procedure in which only a single bit of the basic multiple-bit-resolution ADC output signal is converted back to analog signal for feedback purposes during each oversampling step, as described by T. C. Leslie and B. Singh in their paper "An Improved Sigma-Delta Modulator Architecture", 1990 IEEE SYMPOSIUM ON CIRCUITS & SYSTEMS, 90 CH 2868-8900000-0372, pp. 372–375, incorporated herein by reference. The digitized quadrature-phase video detector response is subjected to digital frame-comb and line-comb filtering to suppress remnant composite video signals; the comb filtering response is supplied to multi-level symbol decision circuitry to recover bit-serial digital data transmitted by the BPSK; and the bit-serial digital data is supplied to a decoder that corrects the digital information in the data using forward-error-correcting codes contained therein.

The inventions described in the patent applications referred to above, like the inventions described herein, are assigned to Samsung Electronics Co., Ltd., pursuant to pre-existing employee agreement so to assign inventions made within the scope of employment. In these patent applications the bit-serial data used for generating the binary phase-shift-keying signal have been processed at the transmitter so that the data will survive comb filtering procedures, which are carried out in the digital signal receiver for suppressing the composite video signals accompanying the data and tending to act as a jamming signal. With regard to operation of the combined NTSC television and BPSK transmitter, partial-response filtering of the bit-serial data subsequently used for generating the binary phase-shift-keying signal is advocated by each of these U.S. patent applications, except for Ser. No. 08/108,311.

In all the digital signal receivers described in the patent applications referred to above, there is a concern to reduce the errors in the reproduced digital data that are attributable to multipath effects, commonly referred to as "ghosting". Such effects are well known to television engineers, occurring quite often in television pictures that have been broadcast over the air or have been transmitted by cable.

The signal to which the television receiver synchronizes is the strongest of the signals it receives, which is called the reference signal, and is usually the direct signal received over the shortest reception path. The multipath signals received over other paths are thus usually delayed with respect to the reference signal and appear as trailing ghost images. It is possible, however, that the direct or shortest path signal is not the signal to which the receiver synchronizes. When the receiver synchronizes to a reflected (longer path) signal, there will be a leading ghost image caused by the direct signal, or there will be a plurality of leading ghosts caused by the direct signal and other reflected signals of lesser delay than the reflected signal to which the receiver synchronizes. The parameters of the multipath signals—namely, the number of different-path responses, the relative amplitudes of the different-path responses, and the differential delay times between different ones of the different-path responses—vary from location to location and from channel to channel at a given location. These parameters may also be time-varying.

The visual effects of multipath distortion can be broadly classified in two categories: multiple images and distortion of the frequency response characteristic of the channel. Both effects occur due to the time and amplitude variations among the multipath signals arriving at the reception site. When the relative delays of the multipath signals with respect to the reference signal are sufficiently large, the visual effect is observed as multiple copies of the same image on the television display displaced horizontally from each other. These copies are sometimes referred to as "macroghosts" to distinguish them from "microghosts", which will be presently described. In the usual case in which the direct signal predominates and the receiver is synchronized to the direct signal, the ghost images are displaced to the right at varying position, intensity and polarity. These are known as trailing ghosts or "post-ghost" images. In the less frequently encountered case where the receiver synchronizes to a reflected signal, there will be one or more ghost images displaced to the left of the reference image. These are known as leading ghosts or "pre-ghost" images.

Multipath signals of relatively short delays with respect to the reference signal do not cause separately discernible copies of the predominant image, but do introduce distortion into the frequency response characteristic of the channel. The visual effect in this case is observed as increased or decreased sharpness of the image and in some cases loss of some image information. These short-delay, close-in or nearby ghosts are commonly caused by unterminated or incorrectly terminated radio-frequency transmission lines such as antenna lead-ins or cable television drop cables. In a cable television environment, it is possible to have multiple close-in ghosts caused by the reflections introduced by having several improperly terminated drop cables of varying lengths. Such multiple close-in ghosts are frequently referred to as "micro-ghosts".

Long multipath effects, or macroghosts, are typically reduced by cancelation schemes. Short multipath effects, or microghosts, are typically alleviated by waveform equalization, generally by peaking and/or group-delay compensation of the video frequency response.

Since the characteristics of a transmitted television signal are known a priori, it is possible, at least in theory, to utilize such characteristics in a system of ghost signal detection and cancelation. Nevertheless, various problems limit this approach. Instead, it has been found desirable to transmit repeatedly a reference signal situated, for example, in a section of the TV signal that is currently unused for video purposes and to utilize this reference signal for detection of ghost signals prior to arranging for the suppression of ghost signals. Typically, lines in the vertical blanking interval (VBI) are utilized. Such a signal is herein referred to as a Ghost Canceling Reference (GCR) signal; and a variety of different GCR signals have been described in patents and other technical publications.

Bessel pulse chirp signals are used in the GCR signal that is the de facto standard for television broadcasting in the United States of America. The distribution of energy in the Bessel pulse chirp signal has a flat frequency spectrum extending continuously across the video frequency band. The chirp starts at the lowest frequency and sweeps upward in frequency therefrom to the 4.1 MHz highest frequency. The chirps are inserted into the first halves of selected VBI lines, the $19^{th}$ line of each field currently being preferred. The chirps, which are on +30 IRE pedestals, swing from −10 to +70 IRE and begin at a prescribed time after the trailing edges of the preceding horizontal synchronizing pulses. The chirp signals appear in an eight-field cycle in which the first, third, fifth and seventh fields have a polarity of color burst defined as being positive and the second, fourth, sixth and eighth fields have an opposite polarity of color burst defined as being negative. The initial lobe of a chirp signal ETP that appears in the first, third, sixth and eighth fields of an eight-field cycle swings upward from the +30 IRE pedestal to +70 IRE level. The initial lobe of a chirp signal ETR that appears in the second, fourth, fifth and seventh fields of the eight-field cycle swings downward from the +30 IRE pedestal to −10 IRE level and is the complement of the ETP chirp signal.

The strategy for eliminating ghosts in a television receiver relies on the transmitted GCR signal suffering the same multipath distortions as the rest of the television signal. Circuitry in the receiver can then examine the distorted GCR signal received and, with a priori knowledge of the distortion-free GCR signal, can configure an adaptive filter to cancel, or at least significantly attenuate, the multipath distortion. A GCR signal should not take up too much time in the VBI (preferably no more than one TV line), but should still contain sufficient information to permit circuitry in the receiver to analyze the multipath distortion and configure a compensating filter to cancel the distortion. The GCR signals are used in the television receiver for calculating the adjustable weighting coefficients of a ghost-cancelation filter through which the composite video signal from the video detector is passed to supply a response in which ghosts are suppressed. The weighting coefficients of this ghost-cancelation filter are adjusted so it has a filter characteristic complementary to that of the transmission medium giving rise to the ghosts. The GCR signals can be further used for calculating the adjustable weighting coefficients of an equalization filter connected in cascade with the ghost-cancelation filter, for providing an essentially flat frequency spectrum response (or other preferred frequency spectrum response) over the complete reception path through the transmitter Vestigial-sideband amplitude-modulator, the reception medium, the television receiver front-end and the cascaded ghost-cancelation and equalization filters.

In a digital signal receiver for receiving digital signals buried in conventional analog television signals, there are advantages to detecting the composite video signal modulating the amplitude of the VSB video carrier using an in-phase video detector, in addition to a quadrature-phase video detector for recovering digital information. The synchronizing pulses for the composite video signal contain a large amount of useful timing information, which can be used to define data frames, data rows, and approximate PSK symbol positions. This timing information can also be used for controlling frame-comb and line-comb filtering of the signal detected by the quadrature-phase video detector, in order to suppress interfering remnants of the composite video signal. These remnants are above the 0.75 MHz frequency where the VSB AM video carrier begins the transition from being a double-sideband amplitude-modulated (DSB AM) carrier to being a single-sideband amplitude-modulated (SSB AM) carrier, exhibiting increased energy up to the 1.25 MHz frequency at which roll-off of the vestigial sideband is complete. The GCR signals transmitted in the $19^{th}$ scan line of each field provide information concerning a modulo-8 field (or half-frame count) that is useful in relating frames of data to each other. Since an in-phase video detector is advantageously included in a digital signal receiver, anyway, the GCR signals it detects from the $19^{th}$ scan line of each field are available as a basis for calculating multipaths in the transmission channel.

SUMMARY OF THE INVENTION

In accordance with the invention, ghosts are eliminated in a digital signal receiver using a strategy that relies on the multipath conditions being the same for the modulation sidebands of a carrier in quadrature phase with the video carrier as for the modulation sidebands of the video carrier itself. An in-phase video detector in the digital signal receiver is followed by a first cascade filter connection of a first ghost-cancellation filter and a first equalization filter. A quadrature-phase video detector in the digital signal receiver is followed by a second cascade filter connection of a second ghost-cancellation filter and a second equalization filter. Gating circuitry selects the scan lines which contain ghost-cancellation reference signals from the video signal response of the first cascade filter connection. The scan lines are accumulated to generate a separated ghosted ghost-cancellation reference signal for use by a microcomputer. The adjustable parameters of the first and second ghost-cancellation filters are adjusted in parallel responsive to calculations made in the microcomputer, and the adjustable parameters of the first and second equalization filters are also adjusted in parallel responsive to further calculations made in the microcomputer. Ghosts in the response of the first cascade filter connection are reduced by iterative feedback. Ghosts in the response of the second cascade filter connection are reduced analogously to the reduction of ghosts in the response of the first cascade filter connection.

DETAILED DESCRIPTION

Figure 1:
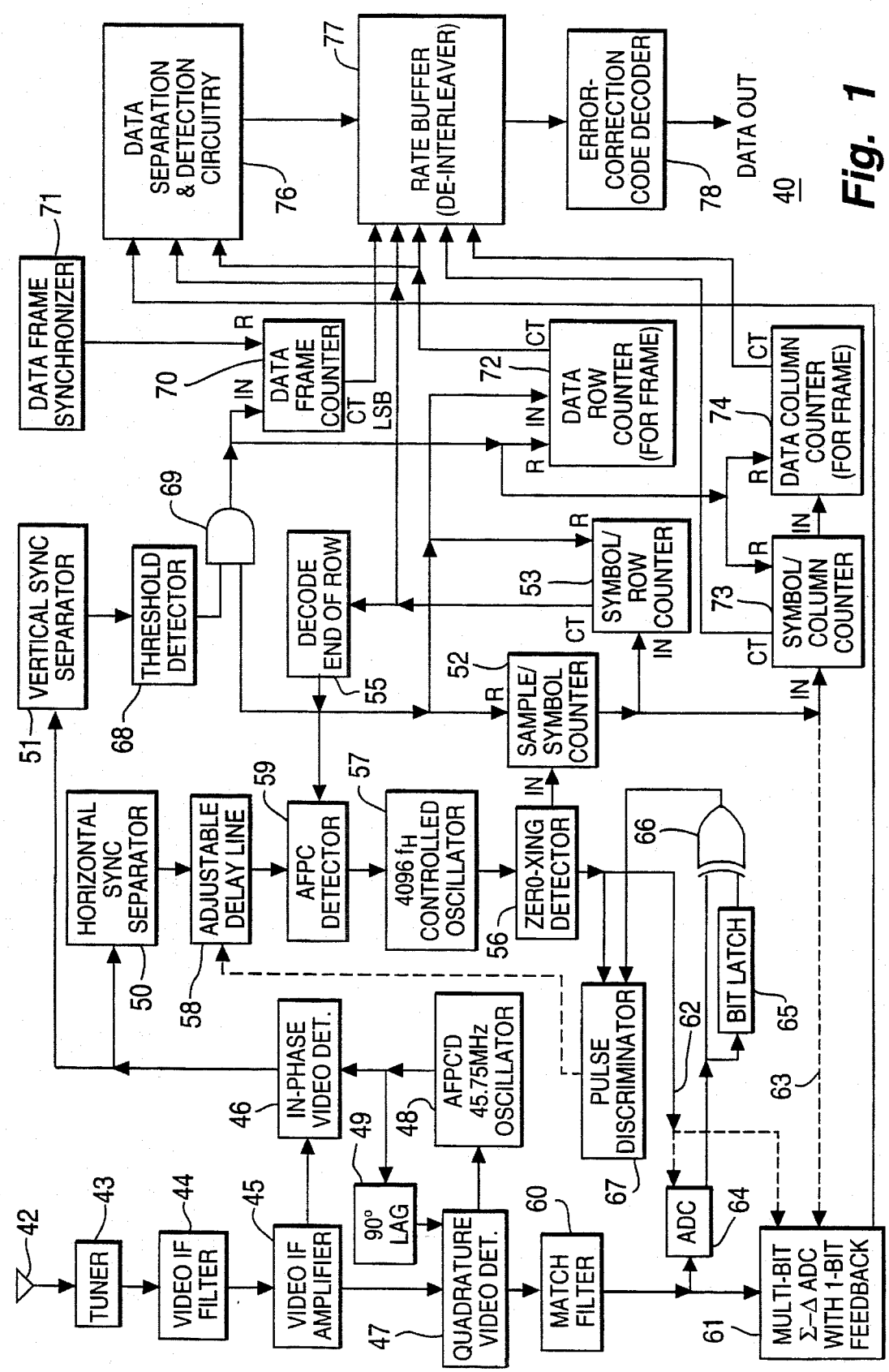
FIG. 1 is a schematic diagram of a digital signal receiver for receiving a television signal with a digital signal buried therewithin and extracting the buried digital signal, which digital signal receiver can be any one of the types described in the "Background of the Invention".

FIG. 1 shows a digital-signal receiver 40 for receiving, from means such as an antenna 42, a television signal with a digital signal buried therewithin and extracting the buried digital signal. A tuner 43 selects the television channel to be detected by the first detector therein, which first detector is a tunable downconverter, conventionally of superheterodyne type, for converting the selected television signal to a set of intermediate frequencies and an image set of frequencies. A video intermediate-frequency (IF) filter 44 selects the video intermediate frequencies for application as input signal to an intermediate-frequency (IF) amplifier 45 and rejects the image set of frequencies. Following the current custom a surface-acoustic-wave (SAW) filter can be used for the video IF filter 44 and to construct the video IF amplifier 45 within a monolithic integrated circuit (IC), as a multi-stage amplifier without interstage tuning. The video IF amplifier 45 supplies the amplified video IF signal to an in-phase synchronous video detector 46 and to a quadrature-phase synchronous video detector 47. An oscillator 48 oscillating with a nominal IF video carrier frequency of 45.75 MHz supplies its oscillations to the in-phase synchronous video detector 46 without phase shift and to a quadrature-phase synchronous video detector 47 with 90° lagging phase shift provided by a shift network 49. The oscillator 48 has automatic frequency and phase control (AFPC) responding to the output signal of the quadrature-phase synchronous video detector 47. The synchronous video detectors 46 and 47 are customarily included together with the video IF amplifier 45 and portions of the oscillator 48 within the IC. Each of the video detectors 46 and 47 may either be of exalted carrier type or of true synchronous type. In-phase modified composite video signal recovered by the in-phase synchronous video detector 46 is supplied to a horizontal sync separator 50 and to a vertical sync separator 51, which recover horizontal and vertical synchronizing pulses from the in-phase modified composite video signal, respectively.

The aspects of the digital-signal receiver 40 thusfar considered are generally familiar to persons skilled in the art of TV receiver design, although the video IF filter 44 is preferably made only about 3.5 MHz wide and is centered at about 45.25 MHz. This video IF filter 44 provides both in-channel and adjacent-channel sound rejection without need for sound trap filtering after the quadrature-phase video detector 47. This video IF filter 44 also suppresses chrominance components of the video signal detected by the in-phase video detector 46 and of the remnant composite video signal detected by the quadrature-phase video detector 47. The bandwidth of the quadrature-phase video detector 47 should be somewhat wider than symbol rate, so as not to attenuate the upper frequencies in the "tail" of BPSK response. The quadrature-phase video detector 47 detects the keying signal, accompanied by only those portions of the NTSC composite video signals at frequencies above 750 kHz.

Figure 2:
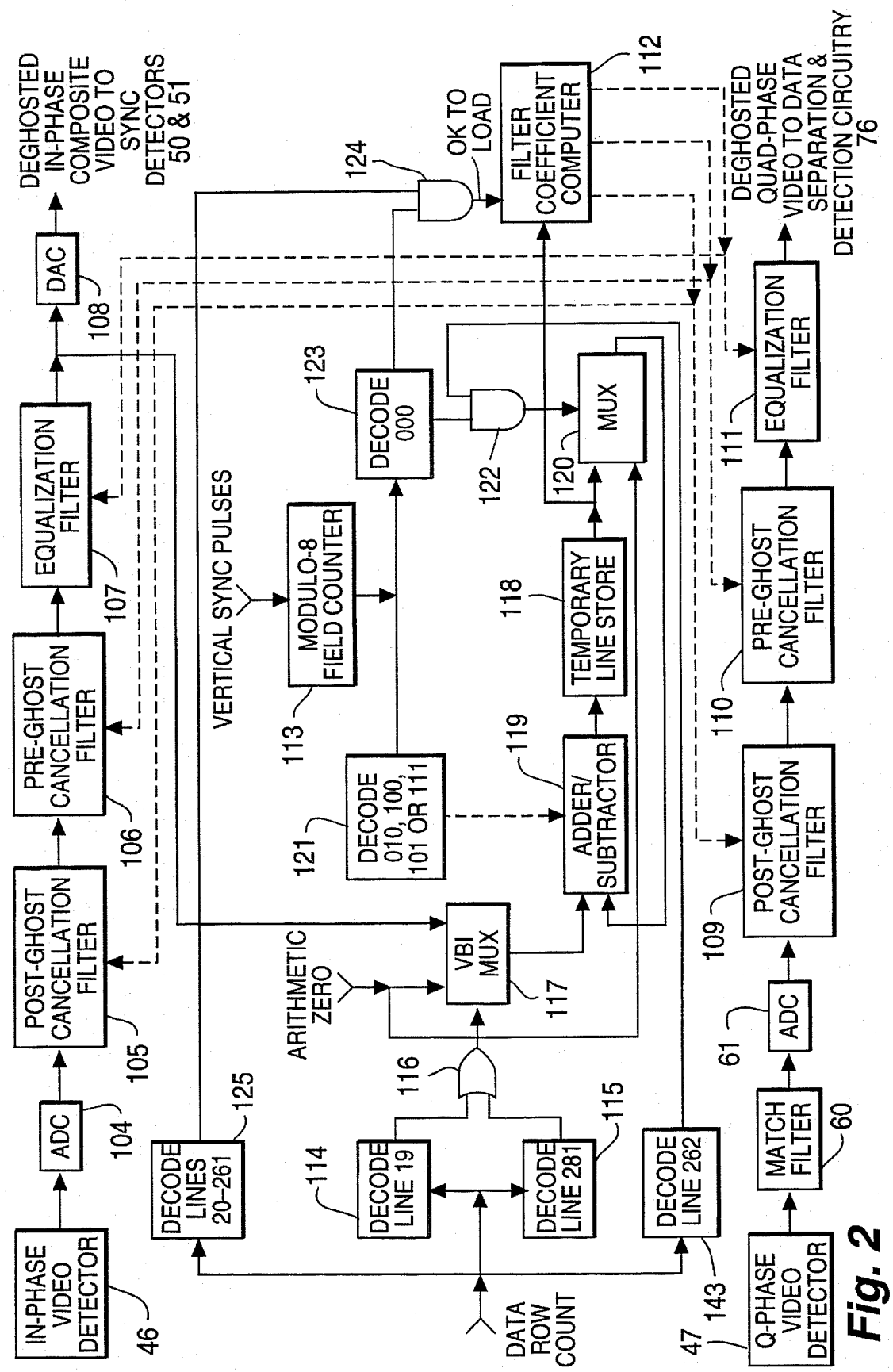
FIG. 2 is a schematic diagram of ghost-suppression circuitry to be included in the FIG. 1 digital signal receiver, in accordance with the invention.

In practice the digital signal receiver 40 usually will include ghost suppression circuitry, which is not separately and explicitly shown in FIG. 1, but is described in detail further on in this specification with reference to FIG. 2 of the drawing. Each of the in-phase and quadrature-phase video detectors 46 and 47 includes, after its synchronous detector per se, respective ghost cancellation and equalization filters similar to those used after the synchronous detector per se included in the other video detector. The adjustable parameters of the two ghost-cancellation filters are adjusted in parallel responsive to calculations made in a computer, and the adjustable parameters of the two equalization filters are also adjusted in parallel responsive to further calculations made in the computer. Ghost-cancellation reference (GCR) signals, which extend up to 4.1 MHz in frequency when transmitted, but extend to only 2.5 MHz or so in a digital signal receiver because of its limited IF bandwidth, are extracted from selected vertical-blanking-interval (VBI) scan lines of the video signal detected by the in-phase synchronous video detector 46. The GCR signals are digitized and supplied as input signal to the computer for calculating the adjustable parameters of the ghost-cancellation and equalization filters. Alternatively or additionally, direct-current or low-frequency components in the quadrature-phase video detector 47 response can be sensed and used as a basis for calculating the adjustable parameters of the ghost-cancellation filters.

In the FIG. 1 digital-signal receiver 40, a SAMPLE-PER-SYMBOL COUNT signal is generated by a sample-per-symbol counter 52 counting pulses generated by a zero-crossing detector 56 in response to sinusoidal oscillations received from a voltage-controlled oscillator 57. The sample-per-symbol counter 52 has four stages and supplies an overflow carry each sixteenth average-axis crossing of the oscillator 57 oscillations. A SYMBOL COUNT signal is generated by a symbol counter 53 counting overflow carries from the sample-per-symbol counter 52. A decoder 55 decodes the SYMBOL COUNT reaching 255 to generate a pulse that resets the counters 52 and 53 on the next pulse supplied to the counter 52 by the zero-crossing detector 56, returning both SAMPLE-PER-SYMBOL COUNT and SYMBOL COUNT to arithmetic zero. The pulses generated by the decoder 55 are supplied to an AFPC detector 59 to be compared to the horizontal sync pulses H separated by the horizontal sync separator 50 and adjustably delayed for fractions of a symbol interval by a controlled delay line 57. The results of the comparison are lowpass filtered within the AFPC detector 59 to generate an automatic frequency and phase control (AFPC) voltage signal for application to the VCO 57. These arrangements control the frequency of the oscillations supplied from the line-locked VCO 57 to be 16×256=4 096 times the horizontal scan line frequency $f_H$, or 64 447 545 Hz. The term "line-locked" used in reference to a controlled oscillator means that the frequency of its oscillations is maintained in constant ratio to the 15 734.264 Hz scan line frequency. This is customarily done by AFPC circuitry comparing the frequency of its oscillations, as divided by a suitable factor, to horizontal synchronizing pulses.

The keying signal and accompanying portions of the NTSC composite video signals at frequencies above 750 kHz detected by the quadrature-phase video detector 47 are supplied to a match filter 60, which responds to the keying signal but only selected portions of the accompanying above-750-kHz frequency components of composite video signal. The match filter 60 provides a peaking response that matches with the roll-off of a transition-shaping filter in the transmitter to extend PSK bandwidth enough to reduce inter-symbol interference. The response from the match filter 60 is applied as input signal to an analog-to-digital converter (ADC) 61, which is preferably of an oversampling type. The quadrature-phase video detector 47 recovers substantially no composite video signal frequencies below 750 kHz and the BPSK coding is such that it has no zero-frequency content. During the transmission of TV images without much energy in the frequencies above 750 kHz, the BPSK portion of the quadrature-phase synchronous video detector 47 response will alternate from one polarity to the other. So the ADC 61 is of a type capable of digitizing analog signal of either positive or negative polarity. More particularly, the ADC 61 is preferably a multi-bit sigma-delta converter with single-bit feedback, as described by T. C. Leslie and B. Singh in their paper "An Improved Sigma-Delta Modulator Architecture", 1990 IEEE SYMPOSIUM ON CIRCUITS & SYSTEMS, 90 CH 2868-8900000-0372, pp. 372–375. A flash converter with 8-bit resolution (which is of modest price) samples the error signal in a second-order sigma-delta feedback loop, and single-bit feedback is used to minimize digital-to-analog conversion errors. The second-order sigma-delta feedback loop is unconditionally stable. The error signal is sampled, by way of specific example, at sixteen times the symbol rate of 256 times horizontal scan line rate $f_H$ for a 16:1 oversampling ratio, sampling each time a pulse is received over a line 62 from the zero-crossing detector 56 each time it detects the oscillations from the oscillator 57 crossing average axis in a prescribed direction. The digital output of the flash converter is supplied to an FIR lowpass filter within the converter 61, and the digital response of this filter is subsampled 16:1 by a subsampler sampling each time a pulse is received over a line 63 from the carry overflow of the sample-per-symbol counter 52. This decimation reduces the amount of storage capability required in the delay portions of the digital comb-filtering to follow. Subsampling at symbol rate, with optimal phasing, is a form of synchronous symbol detection which suppresses response to those components of the composite video signal that exhibit change at symbol rate, but are in quadrature phasing with the sampling at symbol rate. The lowpass filter preceding the subsampler suppresses the chrominance signal frequencies.

A single-bit ADC 64, sampling responsive to pulses supplied by the zero-crossing detector 56 on the line 62, responds to the match filter 60 response to supply a sign bit descriptive of the polarity of the match filter 60 response. That sign bit and that sign bit as delayed by one sample count in a bit latch 65 are supplied as respective inputs to an exclusive-OR gate 66. The XOR gate 66 detects match filter 60 response, supplying the results of this detection to a pulse phase discriminator 67. The pulse phase discriminator 67 selectively detects departures of the zero-crossings of the match filter 60 response, as detected by the XOR gate 66, from proper phasing respective to the zero-crossings of the oscillations of the controlled oscillator 57, as detected by the zero-crossing detector 56. The pulse phase discriminator 67 lowpass filters these selectively detected departures, as sampled and held, thereby to generate a control signal for adjusting the delay the controlled delay line 58 provides for the horizontal sync pulses H applied to the AFPC detector 59. This selective detection by the pulse phase discriminator 67 can be done during portions of the vertical blanking interval when the response of quadrature-phase video detector 47 to composite video signals is expected to be zero-valued. The phasing of the oversampling by the flash converter in the ADC 61, during its digitization of second-order sigma-delta error signal is accordingly adjusted for minimal inter-symbol interference.

The arrangements for adjusting the phasing of the line-locked oscillator are of the type developed by Jung-Wan Ko, a co-worker with the inventors. The AFPC loop controlling the frequency and phasing of the oscillations of the controlled oscillator 57 with respect to the adjustably delayed horizontal sync pulses H supplied from the controlled delay line 57 provides a filtering function that avoids the ADC clocking exhibiting a "glitch" or pronounced shortening of periodicity during phase adjustment. Such glitches occur at times if fine phase adjustment is attempted in the ADC clocking itself.

The vertical sync separator 51 supplies "lossy" integrated response to separated vertical sync pulses V to a threshold detector 68, the threshold voltage of which is chosen such that it is exceeded only when the vertical sync pulses are integrated over more than five-and-a-half scan lines and less than six-and-a-half scan lines. The threshold detector 68 output signal, which is a ONE only when its input signal exceeds its threshold voltage and is otherwise a ZERO is supplied as a first input signal to a two-input AND gate 69. The decoder 55 generates a ONE for the final value of SYMBOL COUNT in each data row (at the finishes of horizontal scan lines) and otherwise generates a ZERO. The decoder 55 supplies its output signal to the AND gate 69 as a second input signal thereto. The AND gate 69 is responsive to the trailing edges of vertical pulses that occur at the beginning of the initial fields of composite video signal frames, to provide a respective DATA-FRAME-END pulse responsive to each of these edges, but is not responsive to the trailing edges of vertical pulses that occur between respective initial and final fields of frames. The DATA-FRAME-END pulses in the AND gate 69 response are supplied to a modulo-2 data frame counter 70 as count input (CI) signal, so as to advance a regenerated DATA FRAME COUNT signal, which is offset by one scan line from the DATA FRAME COUNT signal at the transmitter. A frame synchronizer 71 for resetting the data frame counter 70 will be described in detail further on in this specification, with reference to FIG. 3 of the drawing.

The DATA-FRAME-END pulses in the AND gate 69 response are also applied as a reset (R) signal to a data row counter 72 to reset the DATA ROW COUNT regenerated as its output signal, which should then be 524, to arithmetic zero. The data row counter 72 is connected to count the end-of-row pulses supplied from the decoder 55, which are more reliable in their occurrence than the horizontal sync pulses H supplied from the horizontal sync separator 50. The DATA ROW COUNT is used to control the selection of the VBI scan lines containing GCR signals in the circuitry (not explicitly shown in FIG. 1) for acquiring data for the computer (also not explicitly shown in FIG. 1) that calculates the adjustable filtering parameters for the equalization and ghost-cancellation filters included within the video detectors 46 and 47.

Data separation and detection circuitry 76 receives the digital response of the ADC 61 as input signal. Particular embodiments of the data separation and detection circuitry 76 are described in the patent applications referred to in the "Background of the Invention". The data separation and detection circuitry 76 supplies a bit-serial digital output signal. Assuming that the PSK signal transmitted during each odd-numbered data frame is repeated in opposite sense of modulation during the next even-numbered data frame, a rate buffer 77 will be written to every other data frame with the bit-serial digital output signal supplied from the circuitry 76 at PSK symbol rate. The rate buffer 77 will be read from continuously, to supply its own bit-serial digital output signal at one-half PSK symbol rate to an error-correction code decoder 78. Decoder 78 converts its serial-bit digital input data to parallel-bit form and corrects the errors therein to provide corrected digital data, which are the output data of the digital signal receiver 40.

Preferably, the forward error-correction code is a modified Reed-Solomon type and the digital signal is interleaved data frame by data frame before conversion to PSK. In such case the rate buffer 77 includes two frame stores therewithin and is operated as a de-interleaver. The rate buffer 77 is conditioned by the more-significant bit of the DATA FRAME COUNT to write different ones of two frame stores therewithin on alternate ones of data frame pairs and to read the one of these of two frame stores not selected for writing. The less-significant bit of the DATA FRAME COUNT determines when the valid data frame in each data frame pair is written into the rate buffer 77 operated as a de-interleaver. The write addresses for the frame store the more-significant bit of the DATA FRAME COUNT selects for writing is formed from the DATA ROW COUNT supplied by the counter 72 and from the SYMBOL-PER-DATA-ROW COUNT supplied by the counter 53. The carry overflow pulses from the sample-per-symbol counter 52 are counted by a symbol-per-column counter 73 to generate a SYMBOL-PER-COLUMN COUNT; and the carry overflow pulses from the symbol-per-column counter 73 are counted by a data column counter 74 to generate a DATA COLUMN COUNT. The counters 73 and 74 are reset to initial count at the beginning of each data frame by the AND gate 69 response going to ONE. The DATA COLUMN COUNT and the SYMBOL-PER-COLUMN COUNT together provide the read addressing for the frame store in the rate buffer 77 operated as a de-interleaver that the more-significant bit of the DATA FRAME COUNT selects for reading de-interleaved serial-bit data to the error-correction code decoder 78.

Figure 3:
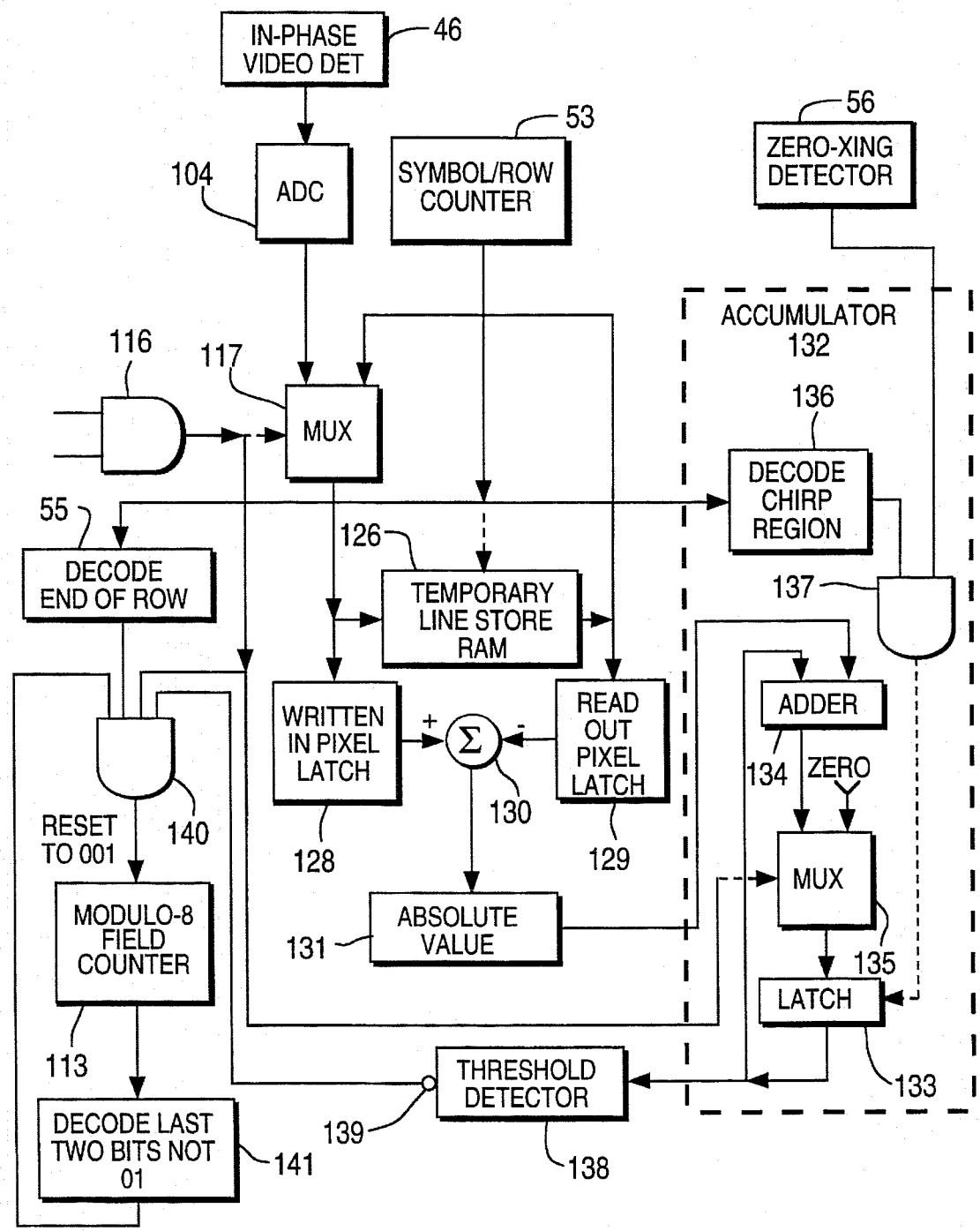
FIG. 3 is a schematic diagram of circuitry for resetting a modulo-eight field counter in the FIG. 2 ghost-suppression circuitry.
Figure 4:
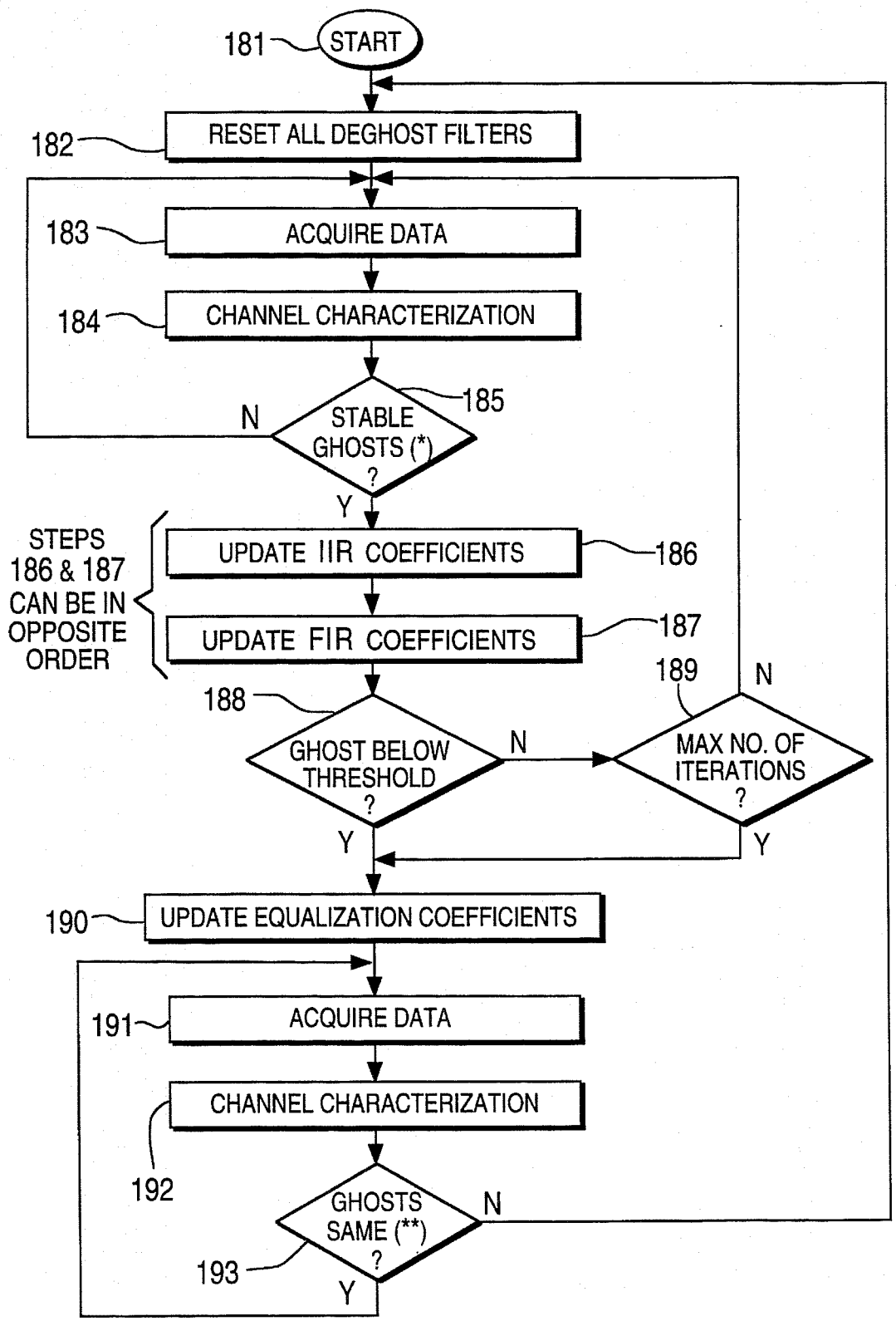
FIG. 4 is a flow diagram of a deghosting method used with the FIG. 2 deghosting circuitry.

FIG. 2 shows representative ghost-suppression circuitry for inclusion in the FIG. 1 digital signal receiver, which ghost-suppression circuitry is designed to utilize the ghost-cancellation reference (GCR) signals that are standard in the United States of America. The ghost suppression circuitry described with reference to FIGS. 2, 3 and 4 is suitable for a digital signal receiver in which the video IF filter 45 rejects the adjacent channel with next higher channel number. The Bessel pulse chirp component of each GCR signal has a flat frequency spectrum extending continuously across the video frequency band, with the chirp starting at the lowest frequency and sweeping upward in frequency therefrom to the 4.1 MHz highest frequency. In preferred designs the lower cut-off frequency of the video IF filter 44 is high enough in frequency to roll-off, beyond 2 MHz or so, the Bessel pulse chirp component of each GCR signal as detected by the in-phase video detector 46.

In FIG. 2 the composite video signal and PSK subcarrier remnants buried therein that are detected by the in-phase video detector 46 are digitized by an analog-to-digital converter 104, similar in construction and operation to the ADC 61 described above with reference to FIG. 1. In FIG. 2 the ADC 104 supplies the digitized in-phase composite video signal with PSK remnants buried therewithin as input signal to a cascade connection of a post-ghost cancelation filter 105, which is an adaptive filter of IIR type; a pre-ghost cancelation filter 106, which is an adaptive filter of FIR type; and an equalization filter 107, which is an adaptive filter of FIR type. The response of the equalization filter 107 is converted back to analog form by a digital-to-analog converter 108 for application to the horizontal sync separator 50 and the vertical sync separator 51 of the FIG. 1 digital signal receiver.

In FIG. 2, as in FIG. 1, the PSK subcarrier and the upper frequencies of the composite video signal that are detected by the quadrature-phase video detector 47 and filtered by the match filter 60 are digitized by an analog-to-digital converter 61. The output signal from the ADC 60 is applied as input signal to a cascade connection of a post-ghost cancelation filter 109, which is similar to the post-ghost cancelation filter 105; a pre-ghost cancelation filter 110, which is similar to the pre-ghost cancelation filter 106; and an equalization filter 111, which is similar to the equalization filter 107. The response of the equalization filter 111 is supplied to the data separation and detection circuitry 76 of FIG. 1 as input signal.

A filter-coefficient computer 112 computes the weighting coefficients for the adaptive filters 105–107 and 109–111. These weighting coefficients are binary numbers, which the filter-coefficient computer 112 writes into registers within the digital filters 105–107 and 109–111. In the IIR filters 105 and 109 the weighting coefficients stored in registers thereof are used as multiplier signals for digital multipliers receiving the filter output signal with various amounts of delay as multiplicand signals. The product signals from the digital multipliers are combined algebraically in digital adder/subtractor circuitry to generate the IIR filter response. In each of the FIR filters 106, 107, 110 and 111 the weighting coefficients stored in registers thereof are used as multiplier signals for digital multipliers receiving the filter input signal with various amounts of delay as multiplicand signals. In each of the FIR filters 106, 107, 110 and 111 the product signals from the digital multipliers are combined algebraically in digital adder/subtractor circuitry to generate the weighted summation response characteristic of an FIR filter.

The number of taps in the FIR filters 106, 107, 110 and 111 depends on the range over which ghost suppression is sought. To keep filter costs within commercial constraints, typically the FIR filters 106 and 110 each have around 64 taps for suppressing ghosts with as much as 6 microseconds displacement from the direct signal. The FIR filters 107 and 111 used for frequency equalization each need only have 32 taps or so. The FIR filters 107 and 111 are typically required to correct in-band video response that can be rolled off by as much as 20 dB at 3.6 MHz, but roll-off at 3.6 MHz is usually less than 10 dB, The roll-off is usually attributable to incorrect orientation of the antenna in off-the-air reception. The cascaded FIR filters 106 and 107 are replaced in some designs by a single FIR filter having about 80 taps, as are the cascaded FIR filters 110 and 111.

The IIR post-ghost cancelation filters 105 and 109 required for suppressing post-ghosts over the full range of 40 microseconds displacement from the direct signal can each be as many as 600 taps long. However, since post-ghosts usually are non-overlapping and occur at discrete displacements, the weighting coefficients for many of these taps of the filters 105 and 109 are zero-valued or nearly so. Each of the tapped delay lines in the IIR filters 105 and 109 is usually designed as a cascade connection of ten-tap-or-so delay lines interspersed with programmable "bulk" delay devices, making each of the filters 105 and 109 what is sometimes termed a "sparse-weighting" filter. The ten-tap-or-so delay lines furnish signals to the digital multipliers for weighting. The incremental delay between successive taps of each of these ten-tap-or-so delay lines is a single half-symbol interval. The programmable bulk delay devices each comprise various length delay lines the chaining together of which can be controlled in response to control signals expressed as binary numbers. Such a sparse-weighting filter will include registers for the binary numbers specifying the delays of the programmable delay devices, the contents of which registers are also controlled by the filter-coefficient computer 112.

The IIR filters 105 and 109 can be included in an integrated device where the same set of registers stores weighting coefficients and bulk delay programming information for both filters. The FIR filters 106 and 110 can be included in an integrated device where the same set of registers stores weighting coefficients for both filters. The FIR filters 107 and 111 can be included in an integrated device where the same set of registers stores weighting coefficients for both filters.

In FIG. 2 the vertical sync pulses separated by the vertical sync separator 51 are counted modulo-8 by a three-stage field counter 113, which generates a MODULO-8 FIELD COUNT. Two stages of this three-stage field counter 113 are the data frame counter 70 of FIG. 1. The first stage of counter 113 generates a count corresponding to the MODULO-2 DATA FRAME PAIR COUNT, used by the rate buffer 77 of FIG. 1 for selecting which of two framestores therein is to be written to and which is to be read from. The middle stage of counter 113 generates a count corresponding to the MODULO-2 DATA FRAME COUNT, used by the rate buffer 77 of FIG. 1 as a further write enable signal for the one of the two framestores therein selected to be written to. The MODULO-8 FIELD COUNT, the SYMBOL-PER-DATA-ROW COUNT from the counter 53, and the DATA ROW COUNT from the counter 64 are available to the filter-coefficient computer 112 for use in timing its operations, although connections for furnishing these counts to the computer 112 are omitted from FIG. 2 to reduce its complexity. Decoders 114 and 115 respond to the DATA ROW COUNTs corresponding to video signal line counts being 19 and 251, respectively, to supply ONEs to an OR gate 116. The OR gate 116 responds to supply a ONE during the scan line in each vertical blanking interval containing GCR signal, to condition the output signal of a multiplexer 117 to correspond to the digitized composite video signal from the output of the cascade connection of filters 105, 106 and 107 supplied as a first input signal thereto, rather than to a wired zero supplied as a zeroeth input signal thereto.

The filter-coefficient computer 112 has control over the operating parameters of the filters 105–107 and the similar operating parameters of the filters 109–111. So, by manipulation of the operating parameters of the filters 105–107 the computer 112 can select the point in the cascade connection of these filters from which GCR signal is separated by the GCR signal separator comprising the elements 114–117. For example, the input signal applied to the cascade connection of the filters 105–107 can be selected to the GCR signal separator by the computer 112, by setting the weighting coefficients of the recursive paths in the IIR filter 105 to zero values, so the output response of the IIR filter 105 corresponds to its input signal; by setting to zero all the weighting coefficients except a unity-valued one defining the kernel center in the FIR filter 106; and by setting to zero all the weighting coefficients except a unity-valued one defining the kernel center in the FIR filter 107. Alternatively, one can make circuit arrangements that will implement more direct and faster selection of the point in the cascade connection of the filters 105–107 from which GCR signal is separated. The fact that the point in the cascade connection of the filters 105–107 from which GCR signal is separated can be selected is important to understand, since this fact will aid in understanding the implementation of the procedure for calculating the variable parameters of the filters 105–107, which is explained further on with reference to the FIG. 4 flow chart. Extracting the GCR signals at the output of the de-ghosting filter permits "closed-loop" de-ghosting procedures to be implemented.

In FIG. 2 a temporary (scan) line store 118 is provided by a random-access memory (RAM) arranged for read-then-write-over operation as each of its storage locations is sequentially addressed in accordance with the SYMBOL-PER-DATA-ROW COUNT. These same addresses are supplied to the filter-coefficient computer 112 to be used to address a line storage register therein when separated GCR signal is transferred thereto from the temporary line store 118. The temporary line store 118 is connected in an arrangement for accumulating the $19^{th}$-VBI-line GCR signals on a per pixel basis for eight successive fields, in a temporal filtering operation that separates the Bessel-chirp information from other information occurring during those $19^{th}$ VBI scan lines.

Elements 113–123 in the FIG. 2 circuitry combine to form a GCR-signal averaging filter that carries out this lowpass temporal filtering operation, which correlates the Bessel-chirp information occurring during those $19^{th}$ VBI scan lines to provide improved signal-to-noise ratio, as compared to using gating simply to separate the Bessel-chirp information from $19^{th}$ VBI scan lines as it occurs. When the corresponding pixels of the eight GCR signals have been accumulated during the $19^{th}$ line of FIELD 000, the eighth and last field of the eight-field sequence, the separated Bessel-chirp information is serially loaded one pixel at a time into a register of the filter-coefficient computer 112 during any line of FIELD 000 when DATA ROW COUNT corresponds to a video signal line count that is in the range from 20 to 261, inclusive, as determined by a decoder 125. In FIG. 2 the line store 118 is cleared of data during the last line of the last field of the eight-field sequence, when a decoder 143 determines that DATA ROW COUNT corresponds to a video signal line count that is 262.

The temporary line store 118 has to have the capability of storing sixteen-parallel-bit samples, assuming that it is to accumulate on a signed basis eight lines of 8-parallel-bit samples of digitized composite video signal supplied from the ADC 104 via the cascaded filters 105–107. The signed arithmetic is preferably two's complement arithmetic. In partial implementation of the arrangement for operating the temporary line store 118 as a signed accumulator for GCR signals, a digital adder/subtractor 119 supplies a 16-parallelbit output signal to the temporary line store 118 as its write input signal. The digital adder/subtractor 119 receives as a first input thereto the output signal of a multiplexer 120, which normally corresponds to the readout from the temporary line store 118 received as the zeroeth input of the multiplexer 120. The digital adder/subtractor 119 receives as a second input thereto the 8-parallel-bit output signal of the multiplexer 117, together with eight wired ZEROs as a sign-bit extension.

A decoder 121 decodes the MODULO-8 FIELD COUNT being one, three, six, or zero (i.e., eight) to furnish a logic ZERO to the digital adder/subtractor 119 to condition it to add its input signals. The decoder 121 decodes the MODULO-8 FIELD COUNT being two, four, five, or seven to furnish a logic ONE to the digital adder/subtractor 119 to condition it subtract its second input signal (supplied from the multiplexer 117) from its first input signal (supplied from the multiplexer 120). This arrangement accumulates in the temporary line store 118 the following function:

(FIELD 001 line 19)–(FIELD 010 line 19)+(FIELD 011 line 19)–(FIELD 100 line 19)–(FIELD 101 line 19)+(FIELD 110 line 19)–(FIELD 111 line 19)+(FIELD 000 line 19).

When each frame of data is transmitted twice, being transmitted a first time in a first logic sense during an odd-numbered one of consecutively numbered frames of the NTSC television signal, and being transmitted a second time in a second sense opposite the first during the next even-numbered one of those frames, the data will average to zero in the final accumulation. When each frame of data is transmitted but once, data transmission may be discontinued during the 19$^{th}$ scan line of each field, so that the result of accumulating GCR signals will not be affected by the data.

During the last line of the eighth field of each sequence of eight fields, the normally ZERO control signal to the multiplexer 120 is caused to be a ONE. This ONE conditions the multiplexer 120 to furnish an output signal corresponding to a first input thereto, which is an arithmetic zero comprising sixteen parallel bits of wired ZEROs. This results in the resetting of the accumulation result in the temporary line store 118 to arithmetic zero. The control signal for the multiplexer 120 is shown in FIG. 2 as being generated by a two-input AND gate 122. The decoder 143 generates one of the input signals to the AND gate 122, supplying a ONE to the AND gate 122 when and only when the DATA ROW COUNT corresponds to a video signal scan line count that is 262. A decoder 123 decodes the MODULO-8 FIELD COUNT from the field counter 113 to generate the other of the input signals to the AND gate 122. The eighth field of each sequence of eight fields generates a 000 MODULO-8 FIELD COUNT from the field counter 113, causing the decoder 123 to supply a ONE to the AND gate 122. Both the input signals to the AND gate 122 are ONE only during the last line of the eighth field of each sequence of eight fields, during which line the AND gate 122 supplies a ONE to the multiplexer 120 as its control signal, causing the accumulation result stored in the temporary line store 118 to be reset to arithmetic zero.

A two-input AND gate 124 supplies a ONE to the filter-coefficient computer 112 when the accumulation result stored in the temporary line store 118 is available for transfer into a ghosted Bessel-chirp register within the internal memory of the computer 112. The output signal of the decoder 123 is one of the input signals to the AND gate 124 and is ONE only during the eighth field of each sequence of eight fields. The decoder 125 decodes DATA ROW COUNT to generate the other of the input signals to the AND gate 124, which is ONE during the video scan lines 20 through 261. Accordingly, the accumulation result stored in the temporary line store 118 is available for transfer into the internal memory of the computer 112 any time during the period including scan lines 20 through 261 in the eighth field of each sequence of eight fields.

In actual practice, it is preferable that the temporary line store 118 stores about two scan lines of samples, so that the deghosting range for post ghosts can be extended to 20 microseconds or so. The storage locations in the RAM used as the temporary line store 118 can be addressed by the least significant bit of DATA ROW COUNT together with the SYMBOL-PER-DATA-ROW COUNT. The decoder 114 is replaced by a decoder that generates a ONE when and only when DATA ROW COUNT is either 19 or 20, and the decoder 116 is replaced by a decoder that generates a ONE when and only when DATA ROW COUNT corresponds to a video scan line count of either 251 or 252. To improve the signal-to-noise ratio of the recovered GCR signal it is advantageous to average the GCR signal not over just eight scan lines 19, but over sixteen (or even higher multiple of eight) scan lines 19. This can be done by modifying the line-19 accumulation circuitry of FIG. 2 or by arranging for the further averaging to be done in the computer 112.

FIG. 3 shows circuitry for resetting the modulo-eight field counter 113 so its count either is correctly phased or is misphased by four fields. A temporary line store 126 is shown as being a random-access memory addressed by the SYMBOL-PER-DATA-ROW COUNT from the counter 53. The line store 126 is arranged for read-then-write-over operation. The logic ONE issued by the OR gate 116 only during the 19$^{th}$ scan line of each field is furnished to a multiplexer 127 to condition the updating of the temporary line store 126 with digitized 19$^{th}$ scan line samples supplied from the ADC 104. During other scan lines the logic ZERO issued by the OR gate 116 conditions the multiplexer 127 to apply the data read from the temporary line store 126 for writing back thereinto.

The temporary line store 126 is provided with pixel latches 128 and 129 clocked by the output signal from the zero-crossing detector 56 (which clocking connections are not shown in FIG. 3). The pixel latches 128 and 129 are used for temporarily storing the last pixel written into the temporary line store 126 and the last pixel read out of the temporary line store 126, respectively, aligning those samples in time to be respective ones of the subtrahend and minuend input signals of a digital subtractor 130. The pixel samples of the difference signal from the subtractor 130 will all be zero valued except during 19$^{th}$ scan lines. The difference signal from the subtractor 130 is furnished to an absolute-value circuit 131. By way of example, the absolute-value circuit 131 comprises a digital controlled adder/subtractor receiving wired arithmetic zero as its summand/minuend input signal, receiving the difference signal from the subtractor 130 as its summand/subtrahend input signal, and responding to the sign bit of that difference signal to add when that bit is ZERO and to subtract when it is ONE.

An accumulator 132 for successive samples of the absolute-value circuit 131 output signal includes an output latch 133 for temporarily storing successive values of the accumulation result, a digital adder 134 for adding the successive samples of the output signal of the absolute-value circuit 131 to the accumulation result to augment its value, and a multiplexer 135 for selectively supplying the augmented accumulation result to the output latch 133 for updating its contents. The multiplexer 135 is wired for inserting arithmetic zero into the output latch 133 whenever the OR gate 116 does not furnish a ONE which ONE indicates that GCR signal is present in the current scan line. A decoder 136 responds to the SYMBOL-PER-DATA-ROW COUNT from the counter 53 being descriptive of those portions of a scan line as may contain Bessel chirp information to furnish a ONE, which is ANDed with the output signal from the zero-crossing detector 56 in an AND gate 137. The output latch 133 is clocked to receive input data responsive only to a ONE being received from the AND gate 137.

The successive samples of the absolute value of the difference of the nineteen lines of the current and previous fields, as supplied serially from the absolute-value circuit 131, are accumulated using the accumulator 132. The accumulation result should have appreciable value if the current field is not FIELD 001 or FIELD 101. The $19^{th}$ lines of FIELD 000 and of FIELD 001 both contain ETP signal, so their difference is zero-valued except for noise. The $19^{th}$ lines of FIELD 100 and of FIELD 101 both contain ETR signal, so their difference is zero-valued except for noise. The output signal of a threshold detector 138, which is a ONE when the accumulation result is substantially more than arithmetic zero and is otherwise a ZERO, is complemented by a NOT gate 139 to supply one of the four input signals of an AND gate 140. A decoder 141 detects the field count from the counter 113 being other than 001 or 101 to furnish a ONE to the AND gate, which ONE is indicative that the field count is misphased and enables the resetting of the counter 113. The output signal of the OR gate 116, which detects the occurrence of the $19^{th}$ line of a field, and the output signal of a decoder 142, which responds to the SYMBOL-PER-DATA-ROW COUNT from the counter 53 to detect the end of a scan line, are the other two input signals to the AND gate 140. Providing that the field count is not 001 or 101, the AND gate 140 generates a ONE to reset the counter 113 to 001 field count at the end of the $19^{th}$ line of a FIELD 000 or of a FIELD 100 in the composite video signal detected by the in-phase video detector 49.

Returning to FIG. 2, if the modulo-eight field count provided by the field counter 113 is correctly phased, the accumulation result attained in the temporary line store 118 during FIELD 000, the last field in the cycle of algebraic accumulation, will be eight times the ETP Bessel chirp signal, devoid of accompanying horizontal sync pulse, front porch, back porch including color burst and +30 IRE pedestal. On the other hand, if the modulo-eight field count provided by the field counter 113 is misphased by four fields, the accumulation result attained in the temporary line store 118 during FIELD 000, the last field in the cycle of accumulation will be eight times the ETR Bessel chirp signal devoid of accompanying horizontal sync pulse, front porch, back porch including color burst and +30 IRE pedestal. A wired three binary place shift in the direction towards reduced magnitude divides the accumulation results attained in the temporary line store 118 during FIELD 000 by eight, and the resulting quotients are supplied as the ETP or ETR signal to the filter-coefficient computer 112.

The filter-coefficient computer 112, which is well-adapted to performing correlations against a ghost-free Bessel chirp function ETP or ETR stored in an internal register thereof, is programmed to perform a correlation substep that determines whether the input it receives from the temporary line store 118 during FIELD 000 is ETP signal, is ETR signal, or is unrelated to the ETP or ETR signal. This procedure enables the filter-coefficient computer 112 to determine when no GCR signals are included in the composite video signal detected by the in-phase video detector 49. The computer 112 may then apply predetermined "bypass-mode" weighting coefficients as stored in registers therewithin to the filters 105, 106 and 107, just as is done in the initial powering up of the ghost-suppression circuitry.

FIG. 4 shows the flow diagram of a procedure for establishing the operating parameters of the filters 105–107 and 109–111, which procedure is carried out by the filter-coefficient computer 112. Entry to the START condition 181 of the procedure is at the time power is turned on in the television receiver, when a new channel is tuned, or when a prescribed time has elapsed since the last deghosting procedure. A RESET ALL DEGHOST FILTERS step 182 preferably sets the filter coefficients in the filters 105–107 and 109–111 to values previously determined for the channel to which the tuner 46 is tuned and stored in a channel-addressed memory. Alternatively, during power-up or retuning, the filter coefficients in the filters 105–107 and 109–111 can be set to "bypass mode" values associated with a ghost-free signal; and during periodic deghosting previous values of the filter coefficients are retained during "reset".

An ACQUIRE DATA step 183 then follows, which step 183 is completed after the number of fields elapse that the computer 112 must wait for accumulation in the temporary line store 118 to be completed, in order to generate a separated GCR signal that is suitable input data for the computer 112. The ACQUIRE DATA step 183 includes a correlation substep not shown in FIG. 4 which substep determines whether the input the computer 112 receives from the temporary line store 118 during FIELD 000 is ETP signal, is ETR signal, or is unrelated to the ETP or ETR signal.

A CHANNEL CHARACTERIZATION step 184 then takes place. The computer 112 carries this out by correlating, in the time domain, the ghost-free GCR signal stored in its permanent memory with the ghosted GCR signal separated from the received composite video signal. The location in time of the predominant response in the data supplied the computer 112 is detected, then the respective location in time of each successively smaller one of the significantly large ghost responses, up to the number of post-ghosts that can be suppressed by the filters 105 and 109, and up to the number of pre-ghosts that can be suppressed by the filters 106 and 110. The respective locations in time of the predominant response and multipath responses in the data supplied the computer 112 are calculated and stored temporarily in the internal memory of the computer 112, to be used as the basis for programming the bulk delay lines interspersed between the clumps of taps in the IIR filters 105 and 109. The relative strengths of the predominant response and multipath responses in the data supplied to the computer 112 are calculated and stored temporarily in the internal memory of the computer 112, to be used as the basis for assigning weights to the clumped taps of IIR filters 105 and 109 and to the taps of FIR filters 106 and 110. The CHANNEL CHARACTERIZATION step 184 is carried forward in the filter coefficients computer 112 by taking the discrete Fourier transform (DFT) of the acquired GCR signal and dividing the terms of that DFT by the corresponding terms of the DFT of a ghost-free GCR signal, which latter DFT is known a priori and is stored in the internal memory of the computer 112. This term-by-term division procedure generates the DFT of the reception channel, which is temporarily stored in the internal memory of the computer 112.

As part of the CHANNEL CHARACTERIZATION step 184, it is preferable to normalize the terms of the DFT of the reception channel respective to the energy in the predominant image. The largest-magnitude term of the DFT of the reception channel is determined and the r-m-s energy of that term and its closeby surrounding terms (e.g., five to seven on each side) is determined. Normalization could be done on the predominate image and all ghost images, but it is preferably from the standpoint of reducing calculations to discard low-energy ghosts before normalization, which is done as follows. The r-m-s energy of the largest-magnitude term of the DFT of the reception channel and its closeby terms, as is descriptive of the predominant image, is scaled down to provide a threshold level against which to compare the r-m-s energies of ghost images described by the other terms of the DFT of the reception channel, in order to determine whether each of those ghost images is or is not significantly large. A threshold level −30 dB down from the r-m-s energy of the predominant image has been found satisfactory. Each of the terms of the DFT of the reception channel that is descriptive of a ghost image having r-m-s energy lower than threshold level is simply replaced by a zero to generate an approximated DFT of the reception channel, to be normalized. In the normalization each of the non-zero terms in the approximated DFT is divided by the r-m-s energy of the predominant image. The normalized approximated DFT of the reception channel is temporarily stored in the internal memory of the computer 112, to be used to support the remaining portions of the calculations. The number of divisions that must be performed in this normalization procedure may be counted, or the number of terms lower than threshold level that are replaced by a zero may be counted as an aid to implementing a later decision step 188 in the FIG. 4 procedure.

Referring back to the FIG. 4 procedure, A STABLE GHOST? decision step 185 follows the CHANNEL CHARACTERIZATION step 184. This step is carried forward using a subroutine where the results of the CHANNEL CHARACTERIZATION step 184 just previous to the most recent CHANNEL CHARACTERIZATION step 184 are fetched from a register in the internal memory of the filter coefficients computer 112 and are replaced in that register by the results of the current CHANNEL CHARACTERIZATION step 184. The results of the most recent CHANNEL CHARACTERIZATION step 184 are cross-correlated with the results of the just-previous CHANNEL CHARACTERIZATION step 184 to determine whether the correlation is sufficiently good that the ghosting conditions can be considered stable, or unchanging. Only if the ghosting conditions are substantially unchanging is a Y(ES) signal generated indicating there a basis for going on further with the deghosting procedure using the most recent CHANNEL CHARACTERIZATION results. If the A STABLE GHOST? decision step 185 generates an N(O) signal indicative of changing ghost conditions, operation loops back to the ACQUIRE DATA step 183, and the adjustable filtering parameters of the IIR filter 105 and of the FIR filter 106 are returned to their initial values, in which the filters 105 and 106 pass the signal without change. Alternatively, in more sophisticated programming, the computer 112 evaluates the severity of changes in the ghosting and decides whether to return the adjustable filtering parameters of the filters 105 and 106 to their initial values or to maintain those parameters at current values. If the STABLE GHOST? decision step 185 generates a Y(ES) signal, the procedure goes on to steps 186–188, which use the most recent CHANNEL CHARACTERIZATION step 184 results as the basis for updating the adjustable filtering parameters of the IIR filters 105 and 109 and of the FIR filters 10 6 and 110.

In the UPDATE IIR COEFFICIENTS step 186 the programmable delays and the non-zero weighting coefficients of the IIR filters 105 and 109 are updated, using the most recent CHANNEL CHARACTERIZATION step 184 results as the basis for the updating. More particularly, the post-ghost portion of the most recent normalized reception channel DFT results, those later in time than the largest-magnitude term, are complemented to generate the DFT of the desired IIR filter 105 (and 109) response, from which DFT the updated IIR filter coefficients are taken. The non-zero terms of the DFT of the desired IIR filter 105 (and 109) response are used to determine weighting coefficients. The lengths of intervals containing all zero coefficients are measured to determine the adjustable delay of bulk delay devices if the IIR filters 105 and 109 are of a sparse coefficient type. The updated IIR filter parameters are applied to the IIR filters 105 and 109.

An UPDATE FIR COEFFICIENTS step 187 is performed after the UPDATE IIR COEFFICIENTS step 186. The non-zero weighting coeffients of the FIR filters 106 and 110 are updated, using the most recent CHANNEL CHARACTERIZATION step 184 results as the basis for the updating. More particularly, the pre-ghost portion of the most recent normalized reception channel DFT results, those earlier in time than the largest-magnitude term, are complemented to generate the DFT of the desired FIR filter 106 (and 110) response, from which DFT the updated FIR filter coefficients are taken. The lengths of intervals containing all zero coefficients are measured to determine the adjustable delay of bulk delay devices if the FIR filters 106 and 110 are of a sparse coefficient type. The updated FIR filter coefficients are applied to the IIR filters 106 and 110.

FIG. 4 shows a decision step 188 of GHOSTS BELOW THRESHOLD? being reached after the UPDATE IIR COEFFICIENTS and UPDATE FIR COEFFICIENTS steps 186 and 187 are performed. The step 188 may be implemented proceeding from the count of the number of divisions performed when normalizing the reception channel DFT in the CHANNEL CHARACTERIZATION step 184, the count being zero generating a Y(ES) signal and the count being other than zero generating a N(O) signal. Alternatively, the step 188 may be implemented proceeding from the count of the number of terms lower than threshold level that are replaced by a zero when normalizing the reception channel DFT in the CHANNEL CHARACTERIZATION step 184, the count being one less than the total number of reception channel DFT terms generating a Y(ES) signal, and other counts generating a N(O) signal.

An N(O) signal resulting from the GHOSTS BELOW THRESHOLD? step 188 directs the operation to a MAXIMUM NUMBER OF ITERATIONS STEP 189. A counter in the computer counts the number of N(O) signals resulting from the GHOSTS BELOW THRESHOLD? decision step 188 and is reset to zero count by a Y(ES) signal resulting from the GHOSTS BELOW THRESHOLD? step 188. An N(O) signal resulting from the GHOSTS BELOW THRESHOLD? step 188 before maximum count is reached by this counter loops operation back to the ACQUIRE DATA step 183. In this case the filter parameters computed in step 184 augment the filter coefficients previously computed in steps 186 and 187. This iterative procedure provides the best ghost suppression that can be obtained for a given structure of the filters 105 and 106.

If the decision in step 188 is Y(ES), all significant ghosts have been canceled, or, if the decision in step 189 is Y(ES), indicating that sufficient iterations have been made that there is assurance that the filters 105, 106, 109 and 110 do not have the capability to be further adjusted to cancel at least one more ghost, the part of the procedure having to do with canceling macroghosts is done and the procedure goes on to an UPDATE EQUALIZATION COEFFICIENTS step 190 in which weighting coefficients for the amplitude-equalization filters 107 and 111 are calculated.

The UPDATE EQUALIZATION COEFFICIENTS step 190 is preferably performed by using an iterative least-means-squares-error method to adjust the filter 107 weighting coefficients so that the response of the cascade connection of filters 105–107 accumulated in the temporary line store 118 best fits an ideal response to a ghost-free GCR Bessel chirp, as stored in the memory of the computer 112. The ideal channel characterization response to a ghost-free GCR Bessel chirp has a (sin x)/x envelope in the time domain, descriptive of a flat response in the frequency domain. This response provides for minimal inter-symbol interference in the PSK. The filter 111 weighting coefficients are adjusted the same as the filter 107 weighting coefficients.

Following the UPDATE EQUALIZATION COEFFICIENTS step 190, another ACQUIRE DATA step 191 follows in the FIG. 4 procedure, which step 191 is completed after the number of fields elapse that the computer 112 must wait for accumulation in the temporary line store 118 to be completed, in order to generate a separated GCR signal that is suitable input data for the computer 112. The ACQUIRE DATA step 191 includes a correlation substep not shown in FIG. 4 which substep determines whether the input the computer 112 receives from the temporary line store 118 during FIELD 000 is ETP signal, is ETR signal, or is unrelated to the ETP or ETR signal.

Another CHANNEL CHARACTERIZATION step 192 then takes place, using any ETP or ETR signal acquired in the step 191 to recalculate the DFT of the reception channel. In a GHOSTS SAME? decision step 193 the DFT of the reception channel recalculated in the CHANNEL CHARACTERIZATION step 192 is correlated with the DFT of the reception channel as previously calculated in the CHANNEL CHARACTERIZATION step 184. From the standpoint of easy implementation, the correlation is preferably done in an indirect manner by checking to see if the residual ghosts in both the CHANNEL CHARACTERIZATION step 184 and the CHANNEL CHARACTERIZATION step 193 are all below prescribed threshold level. If the correlation is good, indicating that ghosting has not changed appreciably, the decision step 193 generates a Y(ES) signal that loops operation back to the ACQUIRE DATA step 191, to continue checking to find out whether or not ghosting has changed appreciably. The filtering parameters of the filters 105–107 (and of the filters 109–111) are left unchanged.

If the correlation is poor, indicating that ghosting has changed, the decision step 193 generates a N(O) signal that loops operation back to the RESET ALL DEGHOST FILTERS step 182. This procedure disables ghost suppression when rapidly changing multipath conditions occur or when a different reception channel is selected. The filtering parameters of the filters 105–107 and 109–111 are then subject to recalculation following the steps already described.

In the FIG. 4 procedure the UPDATE IIR COEFFICIENTS step 186 and the UPDATE FIR COEFFICIENTS step 187 are performed independently during each passage through these two successive steps. The updating of the filter coefficients of the initial ones of the cascaded ghost cancelation filters, here the post-ghost filters 105 and 109, gives rise to spurious ghosts of the type that could be suppressed by updating of the filter coefficients of the final ones of these filters, here the pre-ghost filters 108 and 110. Since the UPDATE IIR COEFFICIENTS step 188 and the UPDATE FIR COEFFICIENTS step 187 do not take these spurious ghosts into account, the subsequent recalculation of the weighting coefficients of the initial one of the cascaded ghost cancelation filters during the next passage through these two successive steps will introduce compensatory ghosts that will reduce the spurious ghosts in the final filter response. Since this reduction may not be complete, recalculation of the weighting coefficients of the final one of the cascaded ghost cancelation filters should be provided for. The decision loop around steps 183–189 implements these recalculations.

The ghost-suppression circuitry in FIGS. 2 and 3 and the method diagrammed in FIG. 4 of computing the filtering parameters for filters in that circuitry are based on inventions of Chandrakant B. Patel and Jian Yang described in U.S. patent application Ser. No. 07/984,488 filed 2 Dec. 1992, entitled "GHOST CANCELATION REFERENCE SIGNAL ACQUISITION CIRCUITRY, AS FOR TV RECEIVER OR VIDEO RECORDER", and assigned to Samsung Electronics, Co., Ltd., pursuant to pre-existing obligations of the inventors to so assign their inventions at the time the inventions were made.

What is claimed is:

1. A receiver for an auxiliary signal transmitted in a combined signal together with a composite video signal having consecutive fields of horizontal scanning lines, a prescribed one of said horizontal scanning lines in each of said fields containing a prescribed one of an eight-field cycle of ghost cancellation reference signals, said composite video signal modulating the amplitude of a video carrier and said auxiliary signal modulating the amplitude of a quadrature carrier in quadrature phasing with said video carrier in said combined signal, which said combined signal is vestigial-sideband filtered prior to its transmission, said receiver comprising:

an in-phase synchronous video detector, responsive to said combined signal as received over at least one transmission path, for detecting modulation of the amplitude of said video carrier to regenerate said composite video signal, accompanied by upper-frequency remnants of said auxiliary signal owing to said vestigial-sideband filtering, as an in-phase detected signal that at times includes undesirable ghosts owing to multipaths;

first deghosting circuitry for providing a response to said in-phase detected signal in which ghosts are to be suppressed, said first deghosting circuitry including respective ghost-suppression filtering having adjustable filtering parameters;

circuitry for accumulating the response of said first deghosting circuitry as occurs only during said prescribed ones of said horizontal scanning lines, each of successive accumulations being done over at least one eight-field cycle of said ghost cancellation reference signals for generating a received ghost cancellation reference signal, said received ghost cancellation reference signal subject to including undesirable ghosts owing to multipaths;

a computer for computing, based upon comparison of said received ghost cancellation reference signal with a ghost-free ghost cancellation reference signal available a priori within said computer, the values of said adjustable filtering parameters required for substantial matching of said received ghost cancellation reference signal with said ghost-free ghost cancellation reference signal;

a quadrature-phase synchronous video detector, responsive to the same received combined signal as said in-phase synchronous video detector, for detecting modulation of the amplitude of said quadrature carrier to regenerate said auxiliary signal, accompanied by upper-frequency remnants of said composite video signal owing to said vestigial-sideband filtering, as a quadrature-phase detected signal that at times includes undesirable ghosts owing to multipaths; and second deghosting circuitry for providing a response to said quadrature-phase detected signal in which ghosts are to be suppressed, said second deghosting circuitry including respective ghost-suppression filtering having adjustable filtering parameters that are adjusted similarly to said adjustable filtering parameters in the respective ghost-suppression filtering included in said first deghosting circuitry.

2. A receiver for an auxiliary signal transmitted in a combined signal together with a composite video signal having consecutive fields of horizontal scanning lines, a prescribed one of said horizontal scanning lines in each of said fields containing a prescribed one of an eight-field cycle of ghost cancellation reference signals, said composite video signal modulating the amplitude of a video carrier and said auxiliary signal modulating the amplitude of a quadrature carrier in quadrature phasing with said video carrier in said combined signal, which said combined signal is vestigial-sideband filtered prior to its transmission, said receiver comprising:

an in-phase synchronous video detector, responsive to said combined signal as received over at least one transmission path, for detecting modulation of the amplitude of said video carrier to regenerate said composite video signal, accompanied by upper-frequency remnants of said auxiliary signal owing to said vestigial-sideband filtering, as an in-phase detected signal that at times includes undesirable ghosts owing to multipaths;

first deghosting circuitry for providing a response to said in-phase detected signal in which ghosts are to be suppressed, said first deghosting circuitry including respective ghost-suppression filtering having adjustable filtering parameters;

circuitry for accumulating the response of said first deghosting circuitry as occurs only during said prescribed ones of said horizontal scanning lines, each of successive accumulations being done over at least one eight-field cycle of said ghost cancellation reference signals for generating a received ghost cancellation reference signal, said received ghost cancellation reference signal subject to including undesirable ghosts owing to multipaths;

a computer for computing, based upon comparison of said received ghost cancellation reference signal with a ghost-free ghost cancellation reference signal available a priori within said computer, the values of said adjustable filtering parameters required for substantial matching of said received ghost cancellation reference signal with said ghost-free ghost cancellation reference signal;

a quadrature-phase synchronous video detector, responsive to the same received combined signal as said in-phase synchronous video detector, for detecting modulation of the amplitude of said quadrature carrier to regenerate said auxiliary signal, accompanied by upper-frequency remnants of said composite video signal owing to said vestigial-sideband filtering, as a quadrature-phase detected signal that at times includes undesirable ghosts owing to multipaths;

second deghosting circuitry for providing a response to said quadrature-phase detected signal in which ghosts are to be suppressed, said second deghosting circuitry including respective ghost-suppression filtering having all adjustable filtering parameters that are all adjusted similarly to said adjustable filtering parameters in the respective ghost-suppression filtering included in said first deghosting circuitry;

a horizontal sync separator for supplying horizontal synchronizing pulses separated from the composite video signal component of said in-phase detected signal;

a vertical sync separator for supplying vertical synchronizing pulses separated from the composite video signal component of said in-phase detected signal;

a data row counter for counting horizontal synchronizing pulses supplied from said horizontal sync separator to generate a data row count, each value of which data row count corresponds to a value of scan line count, said data row counter periodically reset to an initial value of data row count responsive to vertical synchronizing pulses supplied from said vertical sync separator; and means responding to said data row count reaching a prescribed value for grabbing the current scan line of said in-phase detected signal as a component of said received ghost cancellation reference signal.

3. A receiver for an auxiliary signal transmitted in a combined signal together with a composite video signal having consecutive fields of horizontal scanning lines, wherein said auxiliary signal is a digital signal, and wherein a prescribed one of said horizontal scanning lines in each of said fields contains a prescribed one of said horizontal scanning lines in each of said fields contains a prescribed one of an eight-field cycle of ghost cancellation reference signals, said composite video signal modulating the amplitude of a video carrier and said auxiliary signal modulating the amplitude of a quadrature carrier in quadrature phasing with said video carrier in said combined signal, which said combined signal is vestigial-sideband filtered prior to its transmission, said receiver comprising:

an in-phase synchronous video detector, responsive to said combined signal as received over at least one transmission path, for detecting modulation of the amplitude of said video carrier to regenerate said composite video signal, accompanied by upper-frequency remnants of said auxiliary signal owing to said vestigial-sideband filtering, as an in-phase detected signal that at times includes undesirable ghosts owing to multipaths;

first deghosting circuitry for providing a response to said in-phase detected signal in which ghosts are to be suppressed, said first deghosting circuitry including respective ghost-suppression filtering having adjustable filtering parameters;

circuitry for accumulating the response of said first deghosting circuitry as occurs only during said prescribed ones of said horizontal scanning lines, each of successive accumulations being done over at least one eight-field cycle of said ghost cancellation reference signals for generating a received ghost cancellation reference signal, said received ghost cancellation reference signal subject to including undesirable ghosts owing to multipaths;

a computer for computing, based upon comparison of said received ghost cancellation reference signal with a ghost-free ghost cancellation reference signal available a priori within said computer, the values of said adjustable filtering parameters required for substantial matching of said received ghost cancellation reference signal with said ghost-free ghost cancellation reference signal;

a quadrature-phase synchronous video detector, responsive to the same received combined signal as said in-phase synchronous video detector, for detector, for detecting modulation of the amplitude of said quadrature carrier to regenerate said auxiliary signal, accompanied by upper-frequency remnants of said composite video signal owing to said vestigial-sideband filtering, as a quadrature-phase detected signal that at times includes undesirable ghosts owing to multipaths;

second deghosting circuitry for providing a response to said quadrature-phase detected signal in which ghosts are to be suppressed, said second deghosting circuitry including respective ghost-suppression filtering having adjustable filtering parameters that are adjusted similarly to said adjustable filtering parameters in the respective ghost-suppression filtering included in said first deghosting circuitry; and data separation and detection circuitry, receiving the response of said second deghosting circuitry as an input signal thereto, and regenerating said digital signal as an output signal therefrom.

4. A receiver, as set forth in claim 3; wherein said respective ghost-suppression filtering included within said first deghosting circuitry is digital in nature, is preceded by a first analog-to-digital converter for digitizing said in-phase detected signal before its application to said respective ghost-suppression filtering within said first deghosting circuitry, and includes a first infinite-impulse-response digital filter arranged to function as a post-ghost cancelation filter for said in-phase detected signal; and wherein said respective ghost-suppression filtering included within said second deghosting circuitry is digital in nature, is preceded by a second analog-to-digital converter for digitizing said quadrature-phase detected signal before its application to said respective ghost-suppression filtering within said second deghosting circuitry, and includes a second infinite-impulse-response digital filter arranged to function as a post-ghost cancelation filter for said quadrature-phase detected signal, said first and second infinite-impulse-response digital filters each having adjustable filtering parameters adjusted by said computer.

5. A receiver, as set forth in claim 4, wherein said respective ghost-suppression filtering included within said first deghosting circuitry includes, in cascade connection with said first infinite-impulse-response digital filter, a first finite-impulse-response digital filter;

wherein said respective ghost-suppression filtering included within said second deghosting circuitry includes, in cascade connection with said second infinite-impulse-response digital filter, a second finite-impulse-response digital filter; and wherein said first and second finite-impulse-response digital filters each have adjustable filtering parameters adjusted by said computer.

6. A receiver, as set forth in claim 5, wherein said first finite-impulse-response digital filter is arranged to function as a pre-ghost cancelation filter for said in-phase detected signal, and wherein said second finite-impulse-response digital filter is arranged to function as a pre-ghost cancelation filter for said quadrature-phase detected signal.

7. A receiver, as set forth in claim 6; wherein said respective ghost-suppression filtering included within said first deghosting circuitry includes, in cascade connection with said first infinite-impulse-response digital filter and said first finite-impulse-response digital filer, a third finite-impulse-response digital filter arranged to function as an equalization filter for said in-phase detected signal; and wherein said respective ghost-suppression filtering included within said second deghosting circuitry includes, in cascade connection with said second infinite-impulse-response digital filter and said second finite-impulse-response digital filter, fourth finite-impulse-response digital filter arranged to function as an equalization filter for said quadrature-phase detected signal, said third and fourth finite-impulse-response digital filters each having adjustable filtering parameters adjusted by said computer.

8. A receiver for an auxiliary signal transmitted in a combined signal together with a composite video signal having consecutive fields of horizontal scanning lines, a prescribed one of said horizontal scanning lines in each of said fields containing a prescribed one of an eight-field cycle of ghost cancellation reference signals, said composite video signal modulating the amplitude of a video carrier and said auxiliary signal modulating the amplitude of a quadrature carrier in quadrature phasing with said video carrier in said combined signal, which said combined signal is vestigial-sideband filtered prior to its transmission, wherein said auxiliary signal is a digital signal, said receiver comprising;

an in-phase synchronous video detector, responsive to said combined signal as received over at least one transmission path, for detecting modulation of the amplitude of said video carrier to regenerate said composite video signal, accompanied by upper-frequency remnants of said auxiliary signal owing to said vestigial-sideband filtering, as an in-phase detected signal that at times includes undesirable ghosts owing to multipaths;

first deghosting circuitry for providing a response to said in-phase detected signal in which ghosts are to be suppressed, said first deghosting circuitry including respective ghost-suppression filtering having adjustable filtering parameters;

circuitry for accumulating the response of said first deghosting circuitry as occurs only during said prescribed ones of said horizontal scanning lines, each of successive accumulations being done over at least one eight-field cycle of said ghost cancellation reference signals for generating a received ghost cancellation reference signal, said received ghost cancellation reference signal subject to including undesirable ghosts owing to multipaths;

a computer for computing, based upon comparison of said received ghost cancellation reference signal with a ghost-free ghost cancellation reference signal available a priori within said computer, the values of said adjustable filtering parameters required for substantial matching of said received ghost cancellation reference signal with said ghost-free ghost cancellation reference signal;

a quadrature-phase synchronous video detector, responsive to the same received combined signal as said in-phase synchronous video detector, for detecting modulation of the amplitude of said quadrature carrier to regenerate said auxiliary signal, accompanied by upper-frequency remnants of said composite video signal owing to said vestigial-sideband filtering, as a quadrature-phase detected signal that at times includes undesirable ghosts owing to multipaths;

second deghosting circuitry for providing a response to said quadrature-phase detected signal in which ghosts are to be suppressed, said second deghosting circuitry including respective ghost-suppression filtering having all adjustable filtering parameters that are all adjusted similarly to said adjustable filtering parameters in the respective ghost-suppression filtering included in said first deghosting circuitry;

a horizontal sync separator for supplying horizontal synchronizing pulses separated from the composite video signal component of said in-phase detected signal;

a vertical sync separator for supplying vertical synchronizing pulses separated from the composite video signal component of said in-phase detected signal;

a line-locked controlled oscillator for generating oscillations at a multiple of horizontal scan line frequency, as controlled by said horizontal synchronizing pulses separated by said horizontal sync separator;

a symbol-per-data-row counter counting in response to average-axis crossings of the oscillations of said line-locked controlled oscillator to generate a symbol-per-data-row count, said symbol-per-data-row counter periodically reset to an initial value of symbol-per-data-row count responsive to the horizontal synchronizing pulses from said horizontal sync separator;

a data row counter for counting horizontal synchronizing pulses supplied from said horizontal sync separator to generate a data row count, each value of which data row count corresponds to a value of scan line count, said data row counter periodically reset to an initial value of data row count responsive to vertical synchronizing pulses supplied from said vertical sync separator;

an $L^{th}$-line separator for separating scan lines of said in-phase detected signal immediately following a prescribed value of said data row count being attained which is descriptive of said prescribed line of each field during the vertical blanking interval that includes at least at times one of a cycle of M ghost-canceling reference signals, where L is a positive integer and M is an even positive integer at least two;

a field counter responding to said separated vertical synchronizing pulses for generating a field count modulo-MN, where N is a positive integer at least one;

means for synchronizing said field count modulo-MN to said cycle of M ghost-canceling reference signals;

a temporal filter combining corresponding pixels from a number NM of successive scan lines as separated by said $L^{th}$-line separator to generate a temporal filter response that is supplied to said computer as said received ghost-canceling reference signal; and data separation and detection circuitry, receiving the response of said second deghosting circuitry as an input signal thereto, receiving said data row count and said symbol-per-data-row count for controlling data separation and detection, and regenerating said digital signal as an output signal therefrom.

9. A receiver for an auxiliary signal, as set forth in claim 8, wherein said temporal filter comprises:

a temporary line store;

means for emptying said temporary line store after the $L^{th}$ scan line of every $MN^{th}$ field and before the $L^{th}$ scan line of the next succeeding field;

means for reading the contents of said temporary line store to said computer every said $MN^{th}$ field not before the $L^{th}$ scan line of said $MN^{th}$ field, but before the subsequent emptying of said temporary line store;

means for determining first and second conditions of field count according to the polarity of a component of the GCR signal in each field counted;

means responding to said first condition of field count for adding the $L^{th}$ scan line of the currently counted field to the contents of said temporary line store; and means responding to said second condition of field count for subtracting the $L^{th}$ scan line of the currently counted field from the contents of said temporary line store.

10. A receiver, as set forth in claim 9, wherein said number N is one.

11. A receiver, as set forth in claim 9, wherein said component of the GCR signal in each field counted, the polarity of which component determines first and second conditions of field count, is a Bessel chirp.

12. A receiver, as set forth in claim 8, wherein said receiver further comprises:

a symbol-per-data-column counter counting in response to average-axis crossings of the oscillations of said line-locked controlled oscillator to generate a symbol-per-data-column count and supplying a full-count-reached signal whenever said symbol-per-data-column count has attained a prescribed full-count value and rolls over to an initial-count value, said symbol-per-data-column counter periodically reset to said initial-count value of symbol-per-data-column count responsive to the horizontal synchronizing pulses from said horizontal sync separator;

a data column counter for counting full-count-reached signals supplied from said symbol-per-data-column counter to generate a data column count, said data column counter periodically reset to an initial value of data column count responsive to vertical synchronizing pulses supplied from said vertical sync separator;

a rate buffer operative as a de-interleaver responding to output signal from said data separation and detection circuitry supplied to said rate buffer as its input signal for supplying a de-interleaved output signal, said rate buffer receiving as control signals for writing and reading memory therewithin said field count modulo-MN, said symbol-per-data-row count, said data row count, said symbol-per-data-column count, and said data column count; and an error-correction-code decoder responding to output signal from said rate buffer for correcting errors therein.

13. A receiver, as set forth in claim 8, wherein said $L^{th}$ line is line nineteen of each field.

14. A receiver, as set forth in claim 8, wherein said number M is eight, wherein said ghost-canceling reference signals comprise respective Bessel chirps of prescribed magnitude and timing within their respective scan lines in the vertical blanking interval, and wherein the respective Bessel chirps of said ghost-canceling reference signals in each cycle of eight consecutive fields have a prescribed pattern of phasing.

15. A receiver, as set forth in claim 14, wherein said $L^{th}$ line is line nineteen of each field.

* * * * *